(12) United States Patent
Kelly et al.

(10) Patent No.: US 9,307,506 B1
(45) Date of Patent: Apr. 5, 2016

(54) IMPLEMENTATION OF A FIBER DISTRIBUTED ANTENNA SYSTEM NETWORK WHILE MAINTAINING SYNCHRONIZATION

(71) Applicant: Sprint Communications Company L.P., Overland Park, KS (US)

(72) Inventors: Ivy Yvonne Kelly, Overland Park, KS (US); Walter Fred Rausch, Shawnee, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 23 days.

(21) Appl. No.: 14/481,449

(22) Filed: Sep. 9, 2014

(51) Int. Cl.
*H04B 10/00* (2013.01)
*H04W 56/00* (2009.01)
*H04B 10/2575* (2013.01)
*H04W 24/08* (2009.01)
*H04B 10/079* (2013.01)
*H04W 88/08* (2009.01)

(52) U.S. Cl.
CPC ......... *H04W 56/001* (2013.01); *H04B 10/0793* (2013.01); *H04B 10/25754* (2013.01); *H04W 24/08* (2013.01); *H04W 56/006* (2013.01); *H04W 88/085* (2013.01)

(58) Field of Classification Search
USPC .................................................. 398/115–118
See application file for complete search history.

(56) References Cited

U.S. PATENT DOCUMENTS

| | | | | |
|---|---|---|---|---|
| 6,539,026 B1 * | 3/2003 | Waclawsky | ......... | H04L 12/5695 370/252 |
| 6,647,210 B1 * | 11/2003 | Toyoda | ................. | H04J 3/1694 398/100 |
| 6,690,892 B1 * | 2/2004 | Effenberger | .......... | H04J 3/0682 370/230 |
| 6,785,558 B1 * | 8/2004 | Stratford | ............... | H04L 1/0625 455/522 |
| 7,324,457 B2 * | 1/2008 | Lee | .................... | H04B 10/0775 370/249 |
| 7,948,897 B2 * | 5/2011 | Stuart | ................... | H04J 3/0682 370/232 |
| 8,041,223 B2 * | 10/2011 | Kim | ..................... | H04B 7/2643 398/102 |
| 8,213,401 B2 * | 7/2012 | Fischer | ............... | H04W 88/085 370/345 |
| 8,270,987 B2 * | 9/2012 | Boldi | .................. | H04W 88/085 398/115 |
| 8,346,091 B2 * | 1/2013 | Kummetz | ........... | H04W 88/085 370/276 |
| 8,346,278 B2 * | 1/2013 | Wala | ..................... | G01S 5/0054 370/210 |
| 8,396,368 B2 * | 3/2013 | Tarlazzi | ............... | H04B 7/0413 398/115 |
| 8,428,550 B2 * | 4/2013 | Larsen | ................. | G01S 5/0226 455/404.2 |
| 8,526,970 B2 * | 9/2013 | Wala | ..................... | G01S 5/0054 370/210 |
| 8,743,718 B2 * | 6/2014 | Grenier | ................... | H04L 43/10 370/236 |
| 8,958,410 B2 * | 2/2015 | Fischer | ............... | H04W 88/085 370/345 |
| 9,178,635 B2 * | 11/2015 | Ben-Shlomo | ......... | H04L 5/1423 |
| 9,184,843 B2 * | 11/2015 | Berlin | .................... | H04B 7/155 |
| 2003/0185571 A1 * | 10/2003 | Lee | .................... | H04B 10/0775 398/102 |
| 2009/0046586 A1 * | 2/2009 | Stuart | ................... | H04J 3/0682 370/236 |
| 2009/0180407 A1 * | 7/2009 | Sabat | ............... | H04B 10/25754 370/280 |
| 2010/0278530 A1 * | 11/2010 | Kummetz | ........... | H04W 88/085 398/41 |
| 2011/0122772 A1 * | 5/2011 | Stuart | ................... | H04J 3/0682 370/236 |
| 2013/0121703 A1 * | 5/2013 | Kummetz | ........... | H04W 88/085 398/115 |

* cited by examiner

*Primary Examiner* — Agustin Bello

(57) ABSTRACT

Systems for synchronizing transmission through the introduction of a specific additional delay in a wireless telecommunications network are provided. RF transmission delays are adjusted for a distributed antenna system (DAS) that must maintain synchronization with RF transmissions in a macro cellular network. Delays are introduced at each DAS node using a delay panel or a measurement procedure to synchronize the transmission of the DAS with the macro cellular network.

23 Claims, 11 Drawing Sheets

IMPLEMENTATION OF A FIBER DISTRIBUTED ANTENNA SYSTEM NETWORK WHILE MAINTAINING SYNCHRONIZATION

CROSS-REFERENCE TO RELATED APPLICATIONS

Not applicable.

BACKGROUND OF THE INVENTION

The methodology of sending radio frequency (RF) signals over fiber optic cabling in a distributed antenna system (DAS) introduces delay into the RF signal at the remote radio heads. This delay puts the RF signal in the DAS out of synchronization with any surrounding co-channel macro base station signals. The delay increases as the fiber optic cable distance increases between the base station and the DAS nodes or increases between the DAS hub and the DAS nodes. The delay is especially problematic in a time division duplex (TDD) system where precision timing is required. A delay in the DAS timing will impact the timing-related performance in a macro cellular network and vice versa.

SUMMARY

Embodiments of the invention are defined by the claims below, not this summary. A high-level overview of various aspects of embodiments of the invention is provided here for that reason, to provide an overview of the disclosure and to introduce a selection of concepts that are further described below in the detailed description section. This summary is not intended to identify key features or essential features of the claimed subject matter, nor is it intended to be used as an aid in isolation to determine the scope of the claimed subject matter.

Embodiments of the present invention relate generally to a method for synchronizing transmission through the introduction of a specific additional delay in a wireless telecommunications network. Accordingly, the present invention involves the mechanics of delaying transmission of the RF signal in a distributed antenna system (DAS) to coincide with the transmission of RF signals in a macro cellular network.

Different delays are encountered at each node in a DAS due to the specific fiber optic run length from each node to a DAS hub or a base station. The amount of delay at each node is proportional to the specific fiber optic run length. Intentional delays are introduced at each node in the DAS to synchronize the transmission of the RF signal at each node with the transmission of RF signals in the macro cellular network. These inserted delays will offset the delays caused by the fiber optic runs and the additional processing. As a result, the frame timing of the DAS can be aligned precisely with the frame timing of the macro network or macro cellular network.

BRIEF DESCRIPTION OF THE SEVERAL VIEWS OF THE DRAWINGS

Illustrative embodiments of the present invention are described in detail below with reference to the included drawing figures, wherein.

DETAILED DESCRIPTION

Figure 1A:
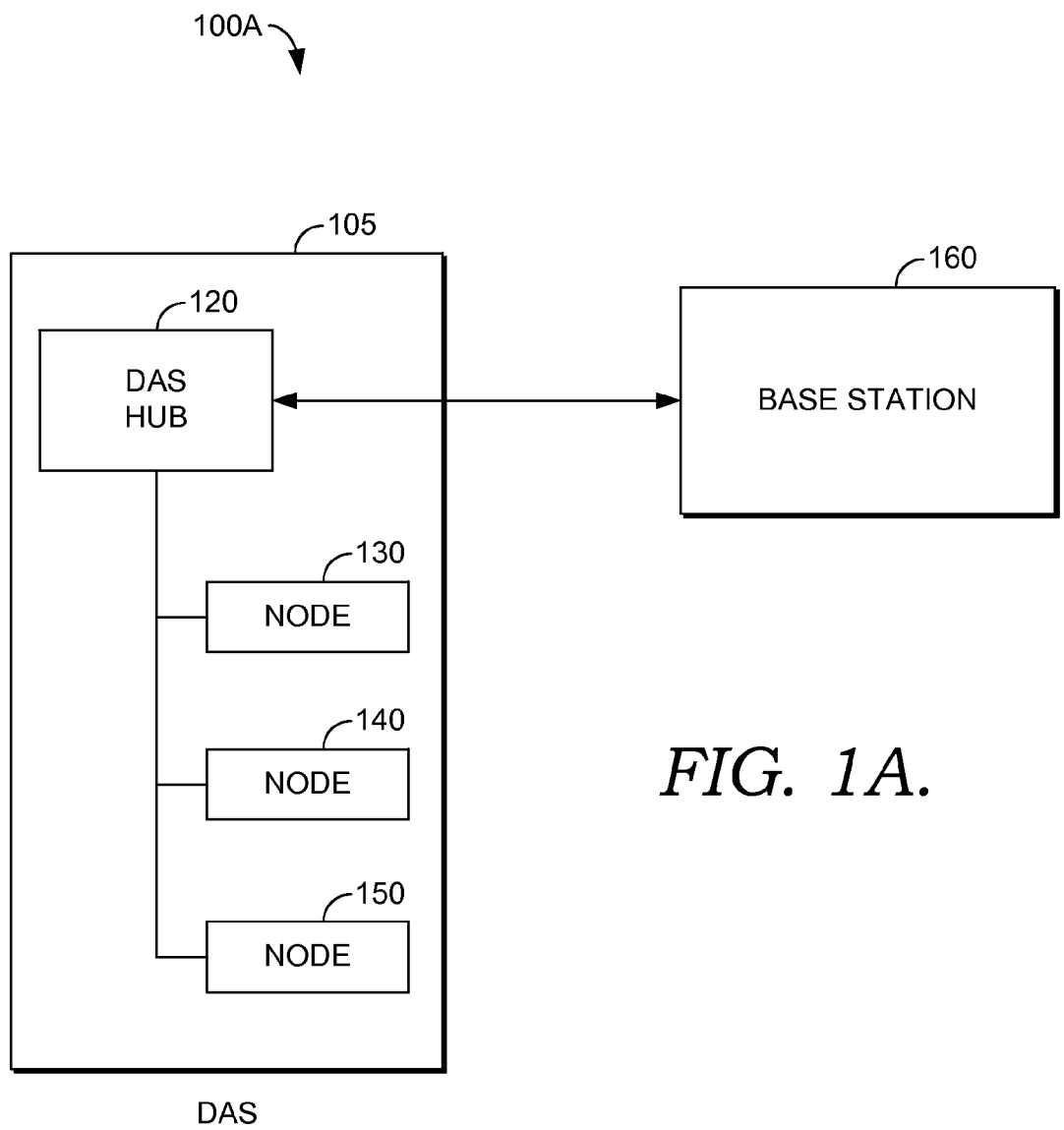
FIG. 1A is an exemplary view of a distributed antenna system, implemented in accordance with an embodiment of the present invention.

Embodiments of the present invention relate generally to systems for synchronizing transmission through the introduction of specific additional delays in a wireless telecommunication network. Accordingly, delays are introduced into DAS nodes to overcome existing delays that cause a timing mismatch between a DAS with its DAS nodes and the macro cellular network. The macro cellular network includes at least those wireless networks that have wireless technologies such as Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Integrated Digital Enhanced Network (iDEN), High Speed Packet Access (HSPA), Worldwide Interoperability for Microwave Access (WiMAX), Long-Term Evolution (LTE), or LTE Advanced. Various embodiments of the present invention include introducing delays at each DAS node, introducing a delay at a base station or DAS hub to delay a data frame, or providing delay devices that introduce delays at DAS nodes. The introduction of the delays is designed to synchronize the frame timing of RF signals of the DAS with its DAS nodes and with the RF signals in the macro cellular network.

In a first aspect, a system for synchronizing transmission through the introduction of a specific additional delay in a wireless telecommunications network is provided that includes at least a distributed antenna system (DAS) connected to a central communications hub site. The central communications hub site is part of a macro cellular network. The DAS comprises DAS nodes distributed in an area to transmit and receive radio frequency (RF) signals. Each of the DAS nodes comprises at least one antenna to facilitate RF transmission. Each of the DAS nodes is located at a same distance or a different distance to another of the DAS nodes from the central communications hub site. The DAS nodes encounter a delay in transmission of the RF signals because of their respective distances from the central communications hub site. Each of the DAS nodes encounters an amount of delay in proportion to its distance from the central communications hub site, as well as net signal processing delays. Each of the DAS nodes further delays transmission to synchronize with transmissions within the macro cellular network. Each of the DAS nodes transmits RF signals at the same time as RF signals in the macro cellular network to avoid interference.

In another aspect, a system for synchronizing transmission through the introduction of a specific additional delay in a wireless telecommunications network is provided that includes a base station that operates located in a macro cellular network and receives timing synchronization from a global positioning system (GPS) source. The base station is connected to a distributed antenna system (DAS). The DAS does not receive timing synchronization from the GPS source. The DAS comprises DAS nodes distributed in an area to transmit and receive radio frequency (RF) signals. Each of the DAS nodes comprises an antenna to facilitate RF transmission and comprises an RF delay device to facilitate transmission delay of an RF signal. Each of the DAS nodes is located at a same distance or a different distance to another of the DAS nodes from the base station. Each of the DAS nodes encounters a transmission delay due to signal process delays and their respective distance from the base station and lack of timing from the GPS source. The RF delay device at each of the DAS nodes delays a transmission of the RF signal such that the RF signal is transmitted at the same time as RF signals within the macro cellular network to avoid interference.

In yet another aspect, a system for reducing transmission interference between wireless devices in a wireless telecommunications network is provided that includes a central communications hub site that operates in a macro cellular network and receives timing synchronization from a global positioning system (GPS) source. Distributed antenna system (DAS) nodes are connected to the central communications hub site in the macro cellular network. The DAS nodes do not receive timing synchronization from the GPS source. Each of the DAS nodes comprises an antenna to facilitate RF transmission. Each of the DAS nodes is located at a same distance or a different distance to another of the DAS nodes from the central communications hub site. The central communications hub site sends a signal that instructs a member of the DAS nodes to go into loop back mode, and subsequently, the central communications hub site measures an amount of delay at the member of the DAS nodes. The central communications hub site communicates the amount of delay to the member of the DAS nodes. The member of the DAS nodes comes out of loop back mode and goes into normal mode after a measurement of the amount of delay. Based on the amount of delay, the member of the DAS nodes sets a start time for transmission based on the amount of delay such that an RF signal is transmitted at the same time as RF signals in the macro cellular network to avoid interference.

In FIG. 1A, a network 100A is shown with a DAS 105 that includes a DAS hub 120 connected to several DAS nodes 130, 140, and 150. DAS 105 is not a single device, but includes several devices included into a system. Typically, DAS 105 is a set of antenna nodes that are stationed in various locations. Each antenna node is commonly called a DAS node (130, 140, and 150) and is located by service providers in areas which might not be conducive to macro cellular equipment such as a base station or cell site. For example, DAS 105 may be found indoors or outdoors, such as in a building or in an area where wireless coverage is restricted. Also, DAS nodes tend to transmit RF signals at a much lower power than ordinary cell sites. Although FIG. 1A shows DAS 105 with three DAS nodes, a DAS may have anywhere from a few DAS nodes to several hundred DAS nodes. The idea here is that a DAS is used to provide wireless coverage as an extension of the macro cellular network.

DAS hub 120 connects multiple DAS nodes, like DAS nodes 130, 140, and 150 to a base station 160. This connection is accomplished using a fiber optic cable such as a single-mode optical fiber. Other connections can be used to connect DAS hub 120 to DAS nodes 130, 140, and 150 and to base station 160, such as stranded copper, coaxial cable, Ethernet, free-space optics, microwave, millimeter-wave, and broadband over power lines. It is noted that DAS nodes 130, 140, and 150 may be located at different distances from DAS hub 120 or base station 160.

As discussed above, DAS 105 connects to base station 160. This connection allows the components of the DAS, such as DAS nodes 130, 140, and 150 to interact with components in the macro cellular network such as base station 160. Although the term base station is used here, it is noted that the terms base station and cell sites are used herein to denote a variety of devices that function in a wireless network. For example, the base station can actually be a base station controller or a radio network controller. The cell site can actually be or include a base transceiver, base transceiver station, or Node B. In other embodiments, these terms or devices can be used more loosely to cover each other or other devices. It is also noted that different wireless technologies may also be implemented in the implementation of the present invention.

Figure 1B:
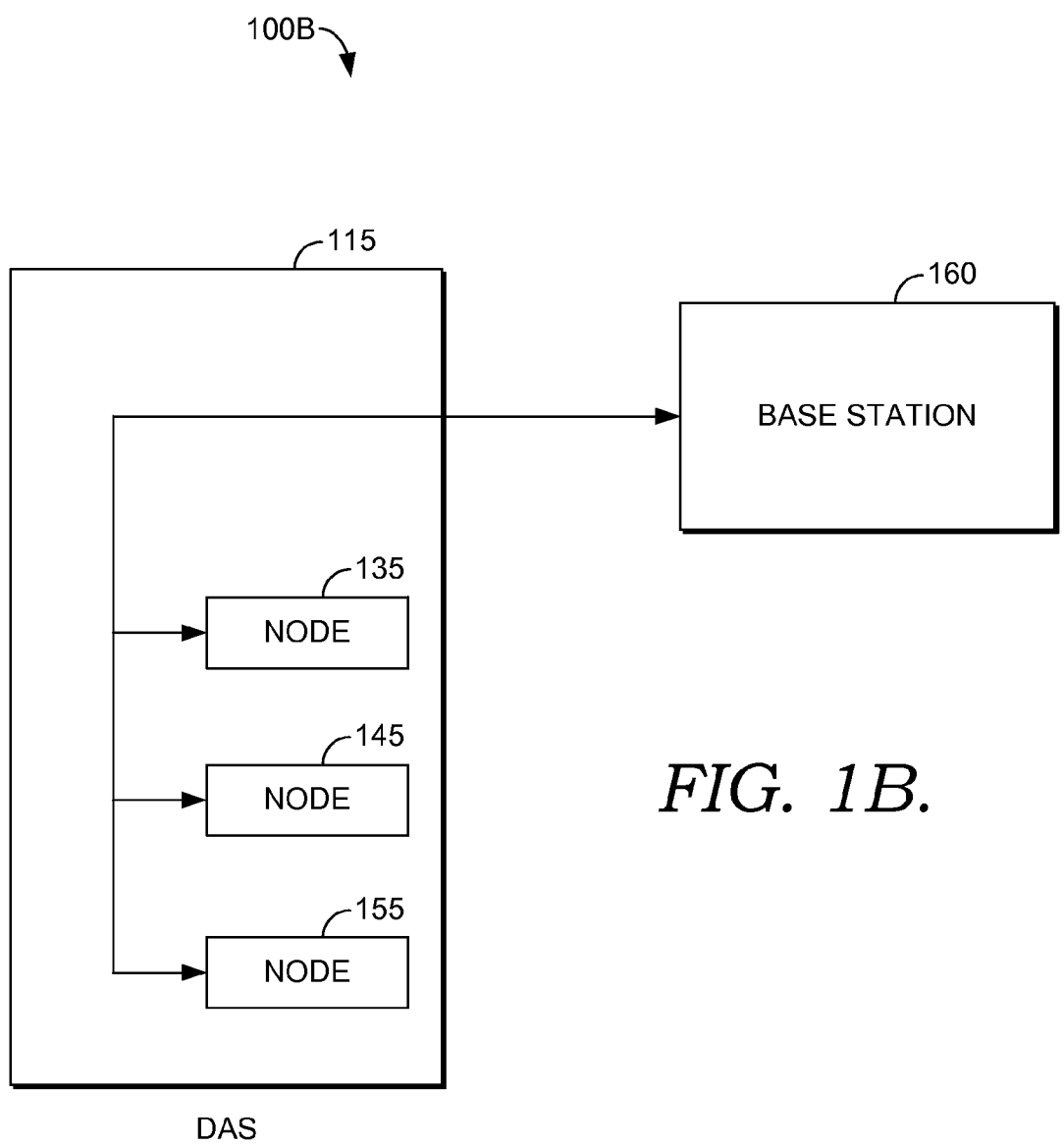
FIG. 1B is another exemplary view of a distributed antenna system, implemented in accordance with an embodiment of the present invention.

Turning now to FIG. 1B, a network 100B shows a DAS 115 with only DAS nodes 135, 145, and 155. DAS 115 illustrates that a DAS may be implemented without a DAS hub found in FIG. 1A. Likewise, DAS nodes 135, 145, and 155 can connect to base station 160. Rather than have a hub to connect the different DAS nodes together within DAS 115, like DAS 105, DAS nodes 135, 145, and 155 may be connected together within base station 160. Again, DAS 115 is not a single device, but a representation of several devices that are deployed with antennas and low power to extend wireless communication.

Figure 2A:
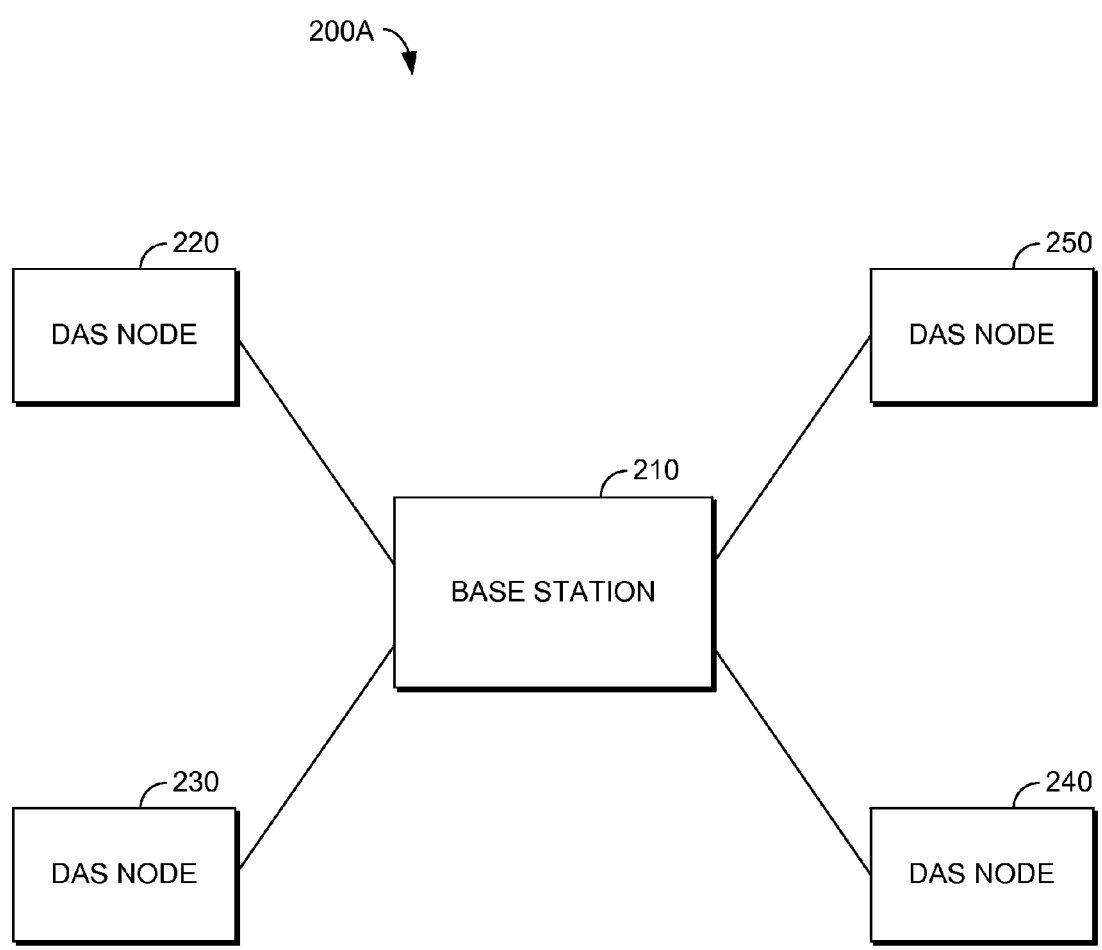
FIG. 2A is an exemplary view of a distributed antenna system in a hub and spoke configuration, implemented in accordance with an embodiment of the present invention.
Figure 2B:
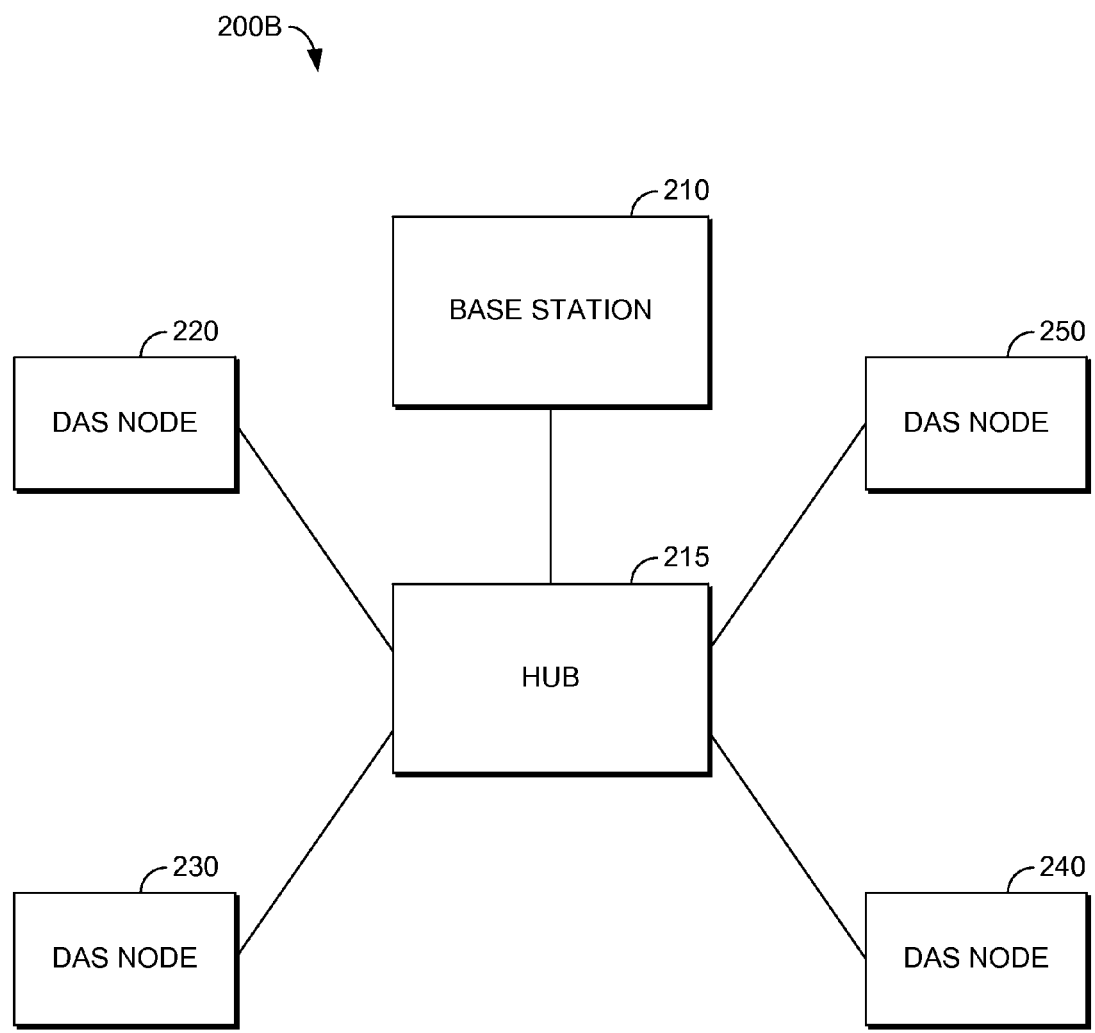
FIG. 2B is another exemplary view of a distributed antenna system in a hub and spoke configuration, implemented in accordance with an embodiment of the present invention.

In FIG. 2A, a network 200A is shown with a base station 210 connected to DAS nodes 220, 230, 240, and 250. FIG. 2A illustrates the configuration that may be implemented to connect DAS nodes to the base station. In network 200A, DAS nodes 220, 230, 240, and 250 are configured in a hub and spoke configuration in relation to base station 210. Each DAS node has a separate connection to base station 210. This connection may be over a fiber optic cable or other communication connection. It is noted that the DAS nodes may have connections that are combined at some point in the connection to base station 210. In FIG. 2B, a network 200B shows DAS nodes 220, 230, 240, and 250 implemented in a similar hub and spoke configuration with the addition of a DAS hub 215. Rather than have the DAS nodes connect together directly at base station 210, DAS nodes 220, 230, 240, and 250 connect together at DAS hub 215 before connecting to base station 210.

Although not shown, DAS nodes 220, 230, 240, and 250 are typically part of one DAS, especially in the case where there is DAS hub 215. However, a subset of the DAS nodes could be part of different DAS systems. For example, in FIG. 2A, DAS nodes 220 and 230 could be part of one DAS in a building with a connection to base station 210. DAS nodes 240 and 250 could part of another DAS located outdoors with a connection to base station 210. The idea here is to illustrate that the DAS nodes can make up one DAS or several DAS systems. The implementer has many flexible options in how the DAS nodes are configured and implemented. Later, it will be shown that the distance from each DAS node to the base station will have an impact on the implementation of embodiments of the present invention.

Figure 3A:
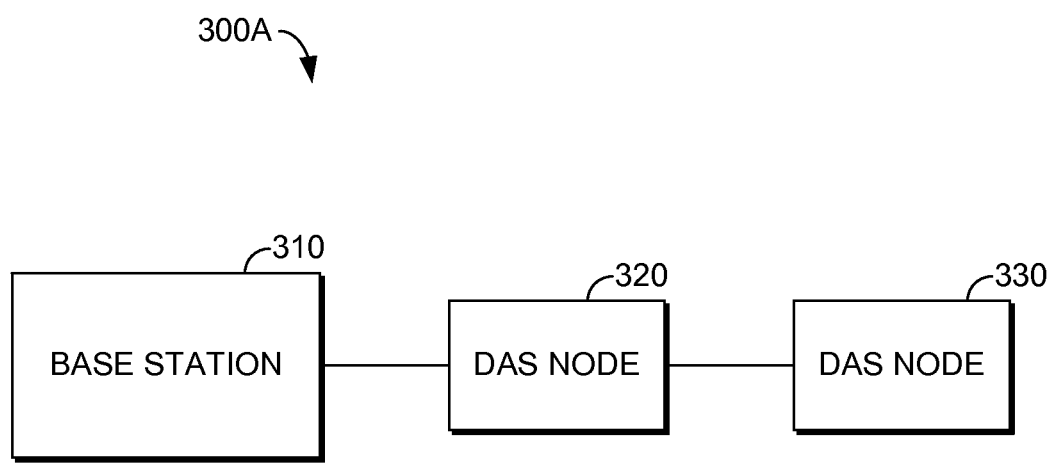
FIG. 3A is an exemplary view of a distributed antenna system in a daisy chain configuration, implemented in accordance with an embodiment of the present invention.
Figure 3B:
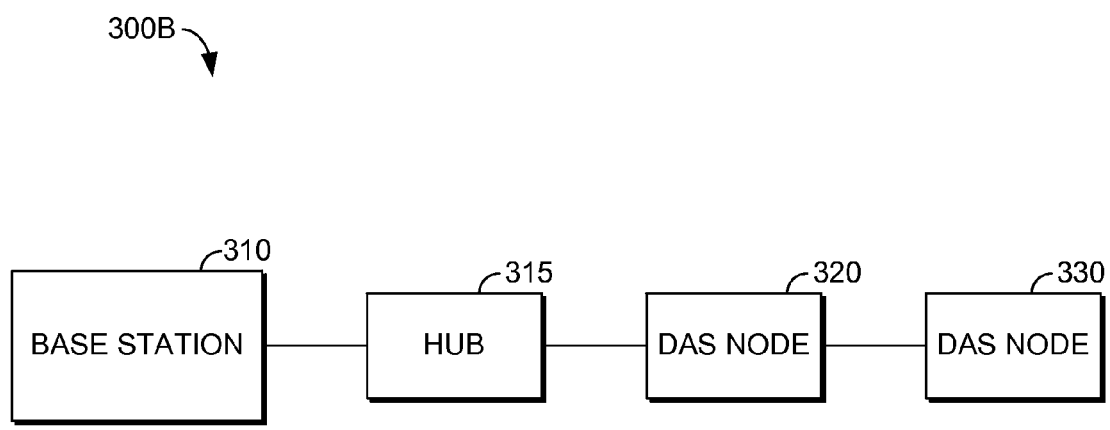
FIG. 3B is another exemplary view of a distributed antenna system in a daisy chain configuration, implemented in accordance with an embodiment of the present invention.

Turning now to FIG. 3A, a network 300A shows a base station 310 connected to a DAS node 320. DAS node 320 is connected to a DAS node 330. Network 300A shows the implementation of the DAS nodes in a daisy chain configuration, which illustrates that DAS nodes can be connected to a base station or a central hub through each other. Again, the connection may be over fiber optic cable or other communication medium. Although not shown as in the earlier figures, DAS nodes 320 and 330 are considered components in a DAS. In FIG. 3B, a network 300B shows a DAS hub 315 located between base station 310 and DAS nodes 320 and 330. DAS hub 315 acts as the central hub to connect the DAS nodes before the connection is made to base station 310. FIG. 3B illustrates a daisy chain configuration like the daisy chain configuration in FIG. 3A. A DAS node may have a fiber optic connection that runs through another DAS node before it connects to DAS hub 315 and/or base station 310. As in FIG. 3A, DAS hub 315 and DAS nodes 320 and 330 are considered components in a DAS.

In implementations of embodiment of the present invention, optical signals, if using fiber optic cable, have to run between base station 310, DAS hub 315, DAS node 320, and DAS node 330. The amount of distance between these components influences the delays encountered at DAS node 320 and DAS node 330. For example, it is preferred that all RF signal transmissions start at the same time to avoid interference in the network. Base station 310 starts RF signal transmission at a particular time along with every other component in the macro cellular network. A trigger or signal is usually received to determine when all components should start transmitting their RF signal. A DAS that extends from the base station must also receive this trigger to know when to transmit RF signals at each DAS node. Unfortunately, since each DAS node is located some distance from the base station, each DAS node may have a delay in transmitting its RF signal. This delay can cause RF signal interference among wireless devices in the DAS and macro cellular network. For example, a mobile device located near the boundary of a cell site might see both the signal transmission of a DAS node and an adjacent cell site. Further, this delay is usually proportional to the DAS node's distance from the base station. In other words, DAS node 330, which is the farthest away, will have more RF signal transmission delay than DAS node 320, which is closer to base station 310 or DAS hub 315. The longer the fiber optic cable runs, the longer the delay. As a result, the present invention enables the delay to be overcome by implementing further delays to allow RF signal transmissions to be in synchronization with RF signal transmissions that occur at the base station and other devices in the macro cellular network.

In some embodiments, the base station may be implemented to automatically delay all data transmission in the DAS nodes by one frame. In this way, the data transmitted from DAS nodes will be one frame behind the data transmitted at components in the macro cellular network, such as the base station.

Figure 4A:
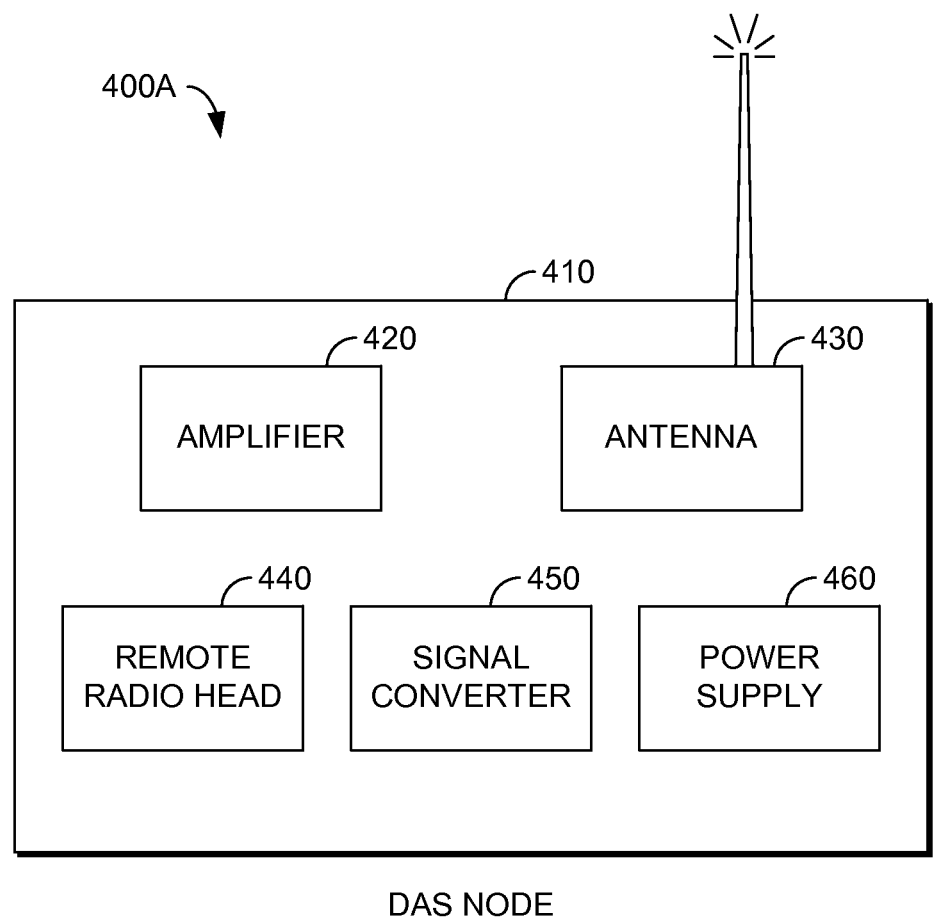
FIG. 4A is an exemplary view of the internal components of a distributed antenna system, implemented in accordance with an embodiment of the present invention.

Up until now, the focus has been on the components of a DAS along with the configuration of the DAS in a network, especially relative to a base station. However, the components of the DAS node are essential to extending wireless coverage within the framework of a macro cellular network. In FIG. 4A, a device 400A illustrates a DAS node 410 that has a variety of components including an amplifier 420, an antenna 430, a remote radio head 440, a signal converter 450, and a power supply 460. In implementations of embodiments of the present invention, DAS node 410 may have additional components to the one listed depending on the desire of the implementer or service provider. Amplifier 420 is used to boost the RF signal. Antenna 430 is used to transmit and receive the RF signal over the airwaves. Mobile telephone users are able to transmit and receive RF signals through their mobile devices. Their RF signals are received from or transmitted to antenna 430. Remote radio head 440 is an extension of the functionality of a base station. Remote radio head 440 is typically the radio equipment that has the base station's RF circuitry. Signal converter 450 is used to convert an optical signal (e.g. light) to an RF signal and vice versa. Signal converter 450 can also provide other converting functionality. Power supply 460 provides the direct and standby power to DAS node 410. Typically, DAS node 410 uses its components to provide wireless coverage in areas of potential high interference, or poor coverage, to eliminate dead zones. In many cases, the power output at antenna 430 is low, allowing for deployment of multiple or numerous nodes like DAS node 410.

Figure 4B:
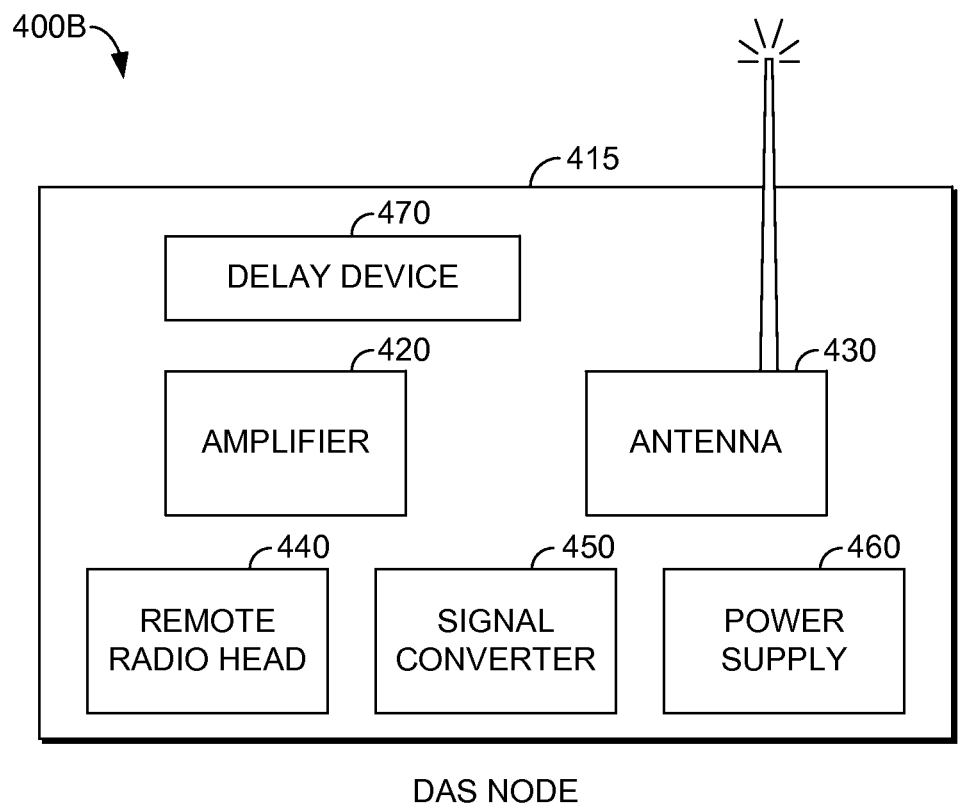
FIG. 4B is another exemplary view of the internal components of a distributed antenna system, implemented in accordance with an embodiment of the present invention.

Turning now to FIG. 4B, a network 400B with a DAS node 415 is similar to network 400A with DAS node 410. However, DAS node 415 has the additional component of a delay device 470. Delay device 470 is used to insert transmission delay of the RF signal. The start of the transmission of the RF signal may be delayed by a programmable amount of time depending on the need. For example, delay device 470 may delay the transmission of the RF signal by microseconds. Also, delay device 470 may be called by different names such as a delay panel.

Regardless of whether a DAS node has a delay device (e.g. delay panel) or not, the present invention focuses on having all DAS nodes transmit at the same time, in synchronization with the macro base station. Each delay device can be calibrated or programmed to insert an amount of delay into a DAS node so that the DAS node's RF transmission synchronizes with the macro base station. Eliminating the interference between a DAS and other macro cellular network equipment is essential. Otherwise, a mobile device could see the DAS and the macro system at the same time, especially if they are all on the same channel. And if the DAS is out of sequence with the macro system, one system could jam the other. The present invention eliminates this interference or potential jamming problem.

Figure 5:
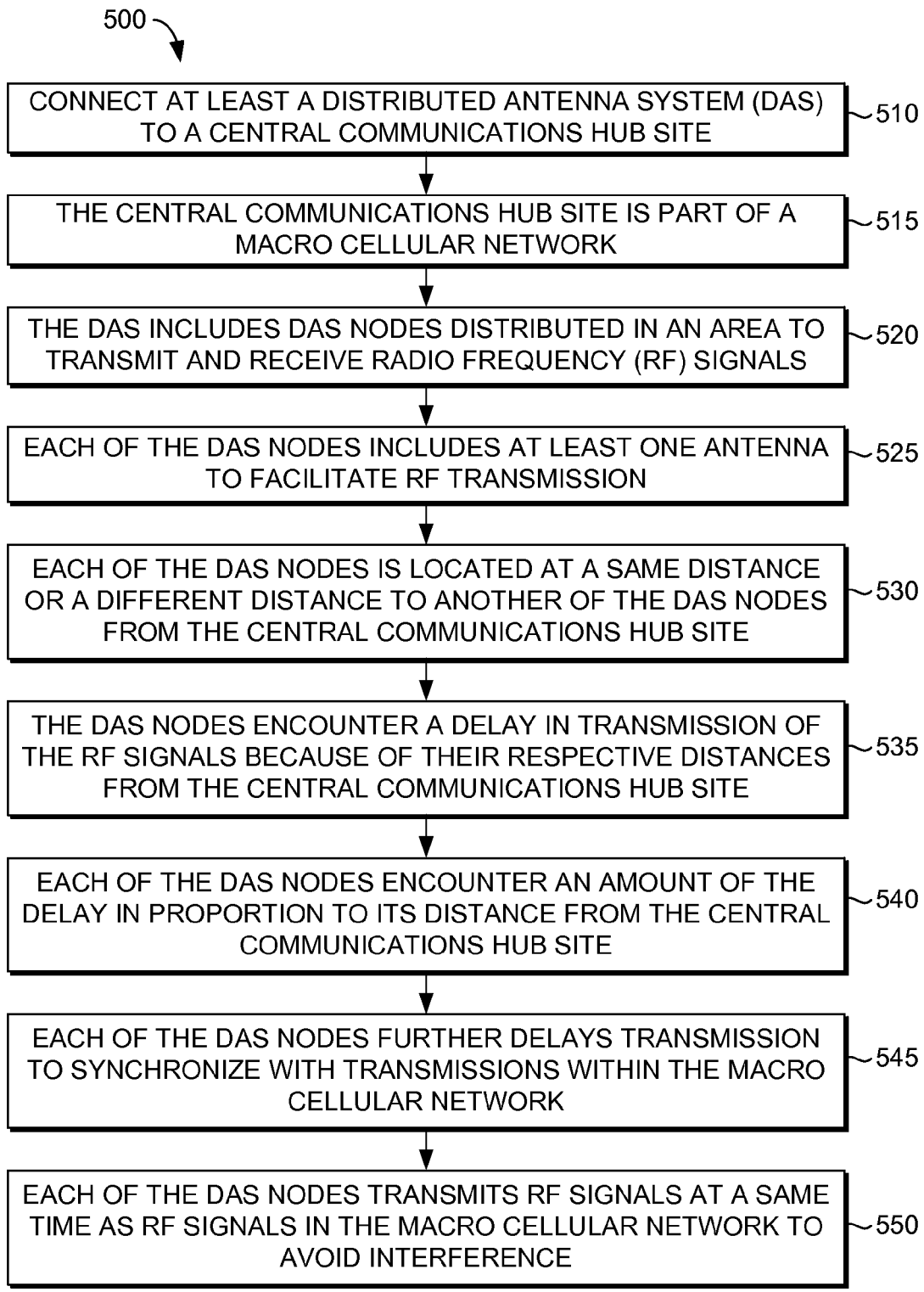
FIG. 5 is a process for synchronizing transmission through the introduction of a specific additional delay in accordance with an embodiment of the present invention.

In FIG. 5, a process for synchronizing transmission through the introduction of a specific additional delay in a wireless telecommunication network is provided in a method 500. In a step 510, distributed antenna system (DAS) 115 is connected to a central communications hub site (base station 160). Base station 160 is part of a macro cellular network, in a step 515. DAS 115 includes DAS nodes 135, 145, and 155 distributed in an area to transmit and receive radio frequency (RF) signals, in a step 520. In a step 525, each of DAS nodes 135, 145, and 155 includes at least one antenna 430 to facilitate RF transmission. Each of DAS nodes 135, 145, and 155 is located at a same distance or a different distance to one another from base station 160 or 210, in a step 530. In a step 535, DAS nodes 135, 145, and 155 encounter a delay in transmission of RF signals because of their respective distances from base station 160 or 210. Each of DAS nodes 135, 145, and 155 encounters an amount of delay in proportion to its distance from base station 160 or 210, in a step 540. Each of DAS nodes 135, 145, and 155 further delays transmission to synchronize with transmissions in the macro cellular network, in a step 545. In a step 550, each of DAS 135, 145, and 155 transmits RF signals at a same time as RF signals in the macro cellular network to avoid interference. The macro cellular network includes the base station and other devices found in the wireless network.

Figure 6:
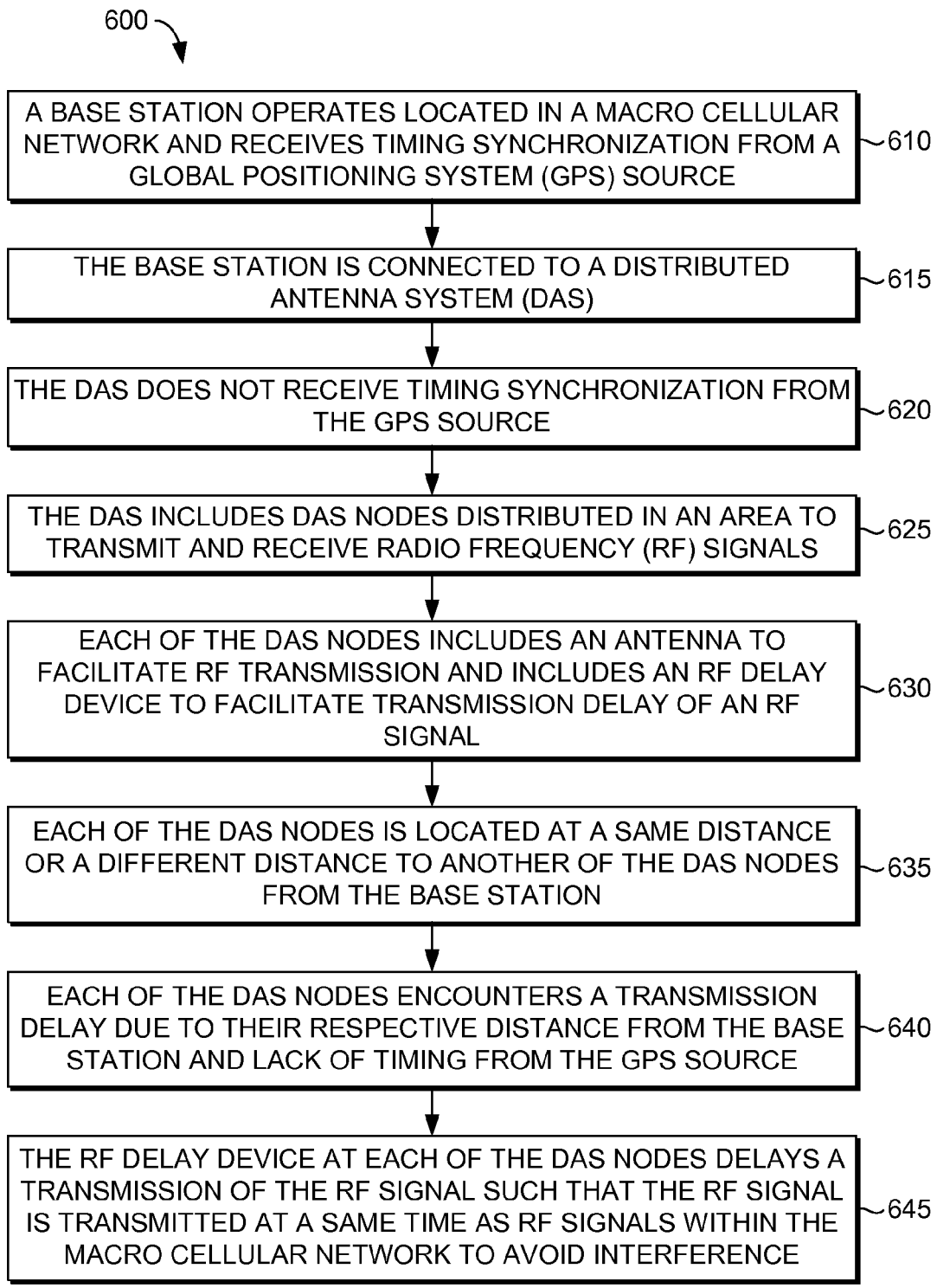
FIG. 6 is another process for synchronizing transmission through the introduction of a specific additional delay in accordance with an embodiment of the present invention.

Turning now to FIG. 6, another process for synchronizing transmission through the introduction of a specific additional delay in a wireless network is provided in a method 600. Base station 310 operates in a macro cellular network and receives timing synchronization from a global positioning system (GPS) source, in a step 610. Base station 310 is connected to a distributed antenna system (DAS) 105 or 115, in a step 615. In a step 620, DAS 105 or 115 does not receive timing synchronization from the GPS source. DAS 105 or 115 includes DAS nodes 320 and 330 distributed in an area to transmit and receive radio frequency (RF) signals, in a step 625. Each of DAS nodes 320 and 330 includes an antenna 430 to facilitate RF transmission and includes an RF delay device 470 to facilitate transmission delay of an RF signal, in a step 630. In a step 635, each of DAS nodes 320 and 330 is located at a same distance or a different distance to one another from base station 310. Each of DAS nodes 320 and 330 encounters a transmission delay due to their respective distance from base station 310 and lack of timing from the GPS source, in a step 640. RF delay device 470 at each of DAS nodes 320 and 330 delays a transmission of the RF signal such that the RF signal is transmitted at a same time as RF signals in the macro cellular network to avoid interference, in a step 645.

Figure 7:
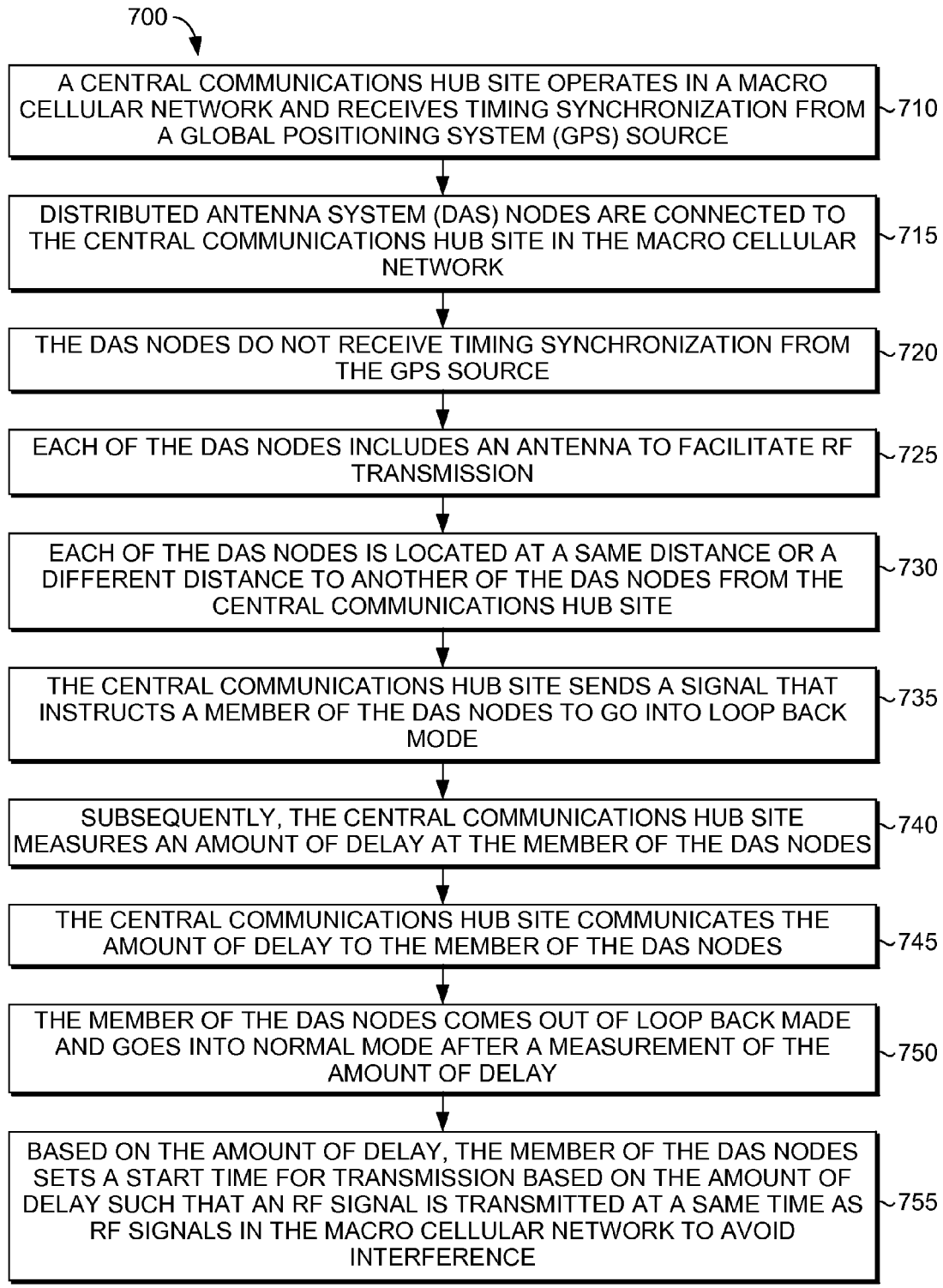
FIG. 7 is a process for reducing transmission interference between wireless devices in accordance with an embodiment of the present invention.

In FIG. 7, a process for reducing transmission interference between wireless devices in a wireless network is provided in a method 700. In a step 710, a central communications hub site (e.g. base station 160, 210, or 310) operates in a macro cellular network and receives timing synchronization from a global positioning system (GPS) source. DAS nodes 320 and 330 (e.g. DAS node 410) are connected to the central communications hub site 310 in the macro cellular network, in a step 715. DAS nodes 320 and 330 do not receive timing synchronization from the GPS source, in a step 720. In a step 725, each of DAS nodes 320 and 330 includes an antenna 430 to facilitate RF transmission. In a step 730, each of DAS nodes 320 and 330 is located at a same distance or a different distance to one another from the central communications hub site 310. The central communications hub site 310 sends a signal that instructs a member of DAS nodes 320 and 330 to go into loop back mode, in a step 735. Subsequently, the central communications hub site 310 measures an amount of delay at DAS node 320 and DAS node 330, in a step 740. In a step 745, the central communications hub site 310 communicates the amount of delay to DAS node 320 and DAS node 330. In a step 750, DAS node 320 and DAS node 330 come out of loop back mode and go into normal mode after a measurement of the amount of delay. Based on the amount of delay, DAS nodes 320 and 330 independently set their frame start time for transmission based on the amount of delay such that the RF signals from each of them are transmitted at a same time as RF signals in the macro cellular network to avoid interference, in a step 755.

In an implementation of an embodiment of the present invention, a system can be auto-programmed to have a base station communicate with each DAS node. The base station instructs each DAS node to go into loop back mode. Once in loop back mode, the base station measures the timing delay that occurs due to the fiber optic cable distance between the base station and the DAS node. Based on the measure of the timing delay for each DAS node, the base station communicates the delay information to each DAS node. In turn, each DAS node sets its RF transmission start time. For example, a DAS node may have a look up table for each timing delay. Based on the timing delay, the look up table can provide the amount of time the RF transmission should be delayed further in order to match the RF signal transmission time in the macro cellular network. After the base station communicates the delay information to the DAS node, the DAS node implements the start procedure for RF transmission. This procedure can be implemented with a delay device such as a delay panel or with another component that can adjust the delay in the DAS node. Once the DAS node delay setup is complete, it goes back into normal mode.

Many different arrangements of the various components depicted, as well as components not shown, are possible without departing from the spirit and scope of embodiments of the present invention. Embodiments of the present invention have been described with the intent to be illustrative rather than restrictive. Certain features and subcombinations are of utility and may be employed without reference to other features and subcombinations and are contemplated to be within the scope of the claims.

The invention claimed is:

1. A system for synchronizing transmission through the introduction of a specific additional delay in a wireless telecommunications network, comprising:
    at least a distributed antenna system (DAS) connected to a central communications hub site, wherein the central communications hub site is part of a macro cellular network;
    the DAS comprising one or more DAS nodes distributed in an area to transmit and receive radio frequency (RF) signals, wherein each of the one or more DAS nodes comprises at least one antenna to facilitate RF transmission, and wherein each of the one or more DAS nodes is located at a same distance or a different distance to another of the one or more DAS nodes from the central communications hub site;
    the one or more DAS nodes encounter a delay in transmission of the RF signals because of their respective one or more distances from the central communications hub site, wherein each of the one or more DAS nodes encounter an amount of the delay in proportion to its distance from the central communications hub site; and
    each of the one or more DAS nodes further delays transmission to synchronize with transmissions within the macro cellular network, wherein each of the one or more DAS nodes transmits RF signals at a same time as RF signals in the macro cellular network to avoid interference.

2. The system of claim 1, wherein a DAS node includes at least one of an antenna, amplifier, remote radio head, signal converter, and a power supply.

3. The system of claim 2, wherein the central communications hub site is a base station.

4. The system of claim 2, wherein the macro cellular network includes wireless technologies such as Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Integrated Digital Enhanced Network (iDEN), High Speed Packet Access (HSPA), Worldwide Interoperability for Microwave Access (WiMAX), Long-Term Evolution (LTE), or LTE Advanced.

5. The system of claim 2, wherein each of the one or more DAS nodes is connected to the central communications hub site over a fiber optic cable.

6. The system of claim 5, wherein the one or more DAS nodes are connected to the central communications hub site with fiber optic cables in a hub and spoke configuration.

7. The system of claim 5, wherein the one or more DAS nodes are connected to the central communications hub site with fiber optic cables in a daisy chain configuration, wherein one of the one or more DAS nodes connects to the central communications hub site through another of the one or more DAS nodes.

8. A system for synchronizing transmission through the introduction of a specific additional delay in a wireless telecommunications network, comprising:
   a base station operates located in a macro cellular network and receives timing synchronization from a global positioning system (GPS) source;
   the base station connected to a distributed antenna system (DAS), wherein the DAS does not receive timing synchronization from the GPS source;
   the DAS comprising one or more DAS nodes distributed in an area to transmit and receive radio frequency (RF) signals, wherein each of the one or more DAS nodes comprises an antenna to facilitate RF transmission and comprises an RF delay device to facilitate transmission delay of an RF signal, and wherein each of the one or more DAS nodes is located at a same distance or a different distance to another of the one or more DAS nodes from the base station;
   each of the one or more DAS nodes encounters a transmission delay due to their respective distance from the base station and lack of timing from the GPS source; and
   the RF delay device at each of the one or more DAS nodes delays a transmission of the RF signal such that the RF signal is transmitted at a same time as RF signals within the macro cellular network to avoid interference.

9. The system of claim 8, wherein the base station delays transmission to the DAS such that a data transmission from the DAS is at least one frame behind the data transmission in the macro cellular network, wherein the data transmission from the one or more DAS nodes are at least one frame behind the data transmission in the macro cellular network.

10. The system of claim 8, wherein a DAS node includes at least one of an antenna, amplifier, remote radio head, signal converter, and a power supply.

11. The system of claim 10, further comprising the DAS including a DAS hub with the one or more DAS nodes, wherein the DAS hub connects the one or more DAS nodes with the base station.

12. The system of claim 10, wherein the macro cellular network includes wireless technologies such as Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Integrated Digital Enhanced Network (iDEN), High Speed Packet Access (HSPA), Worldwide Interoperability for Microwave Access (WiMAX), Long-Term Evolution (LTE), or LTE Advanced.

13. The system of claim 10, wherein each of the one or more DAS nodes is connected to the base station over a fiber optic cable.

14. The system of claim 13, wherein the one or more DAS nodes are connected to the base station with fiber optic cables in a hub and spoke configuration.

15. The system of claim 13, wherein the one or more DAS nodes are connected to the base station with fiber optic cables in a daisy chain configuration, wherein one of the one or more DAS nodes connects to the base station through another of the one or more DAS nodes.

16. A system for reducing transmission interference between wireless devices in a wireless telecommunications network, comprising:
   a central communications hub site operable in a macro cellular network and receives timing synchronization from a global positioning system (GPS) source;
   one or more distributed antenna system (DAS) nodes connected to the central communications hub site in the macro cellular network, wherein the one or more DAS nodes do not receive timing synchronization from the GPS source, wherein each of the one or more DAS nodes comprises an antenna to facilitate RF transmission, and wherein each of the one or more DAS nodes is located at a same distance or a different distance to another of the one of more DAS nodes from the central communications hub site;
   the central communications hub site sends a signal that instructs a member of the one or more DAS nodes to go into loop back mode, and subsequently, the central communications hub site measures an amount of delay at the member of the one or more DAS nodes, wherein the central communications hub site communicates the amount of delay to the member of the one or more DAS nodes;
   the member of the one or more DAS nodes comes out of loop back mode and goes into normal mode after a measurement of the amount of delay;
   based on the amount of delay, the member of the one or more DAS nodes sets a start time for transmission based on the amount of delay such that an RF signal is transmitted at a same time as RF signals in the macro cellular network to avoid interference.

17. The system of claim 16, wherein a DAS node includes at least one of an antenna, amplifier, remote radio head, signal converter, and a power supply.

18. The system of claim 17, wherein the central communications hub site is a base station.

19. The system of claim 17, further comprising a DAS hub inserted between the one or more DAS nodes and the central communications hub site, wherein the DAS hub connects the one or more DAS nodes with the central communications hub site.

20. The system of claim 17, wherein the macro cellular network includes wireless technologies such as Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Integrated Digital Enhanced Network (iDEN), High Speed Packet Access (HSPA), Worldwide Interoperability for Microwave Access (WiMAX), Long-Term Evolution (LTE), and LTE Advanced.

21. The system of claim 17, wherein each of the one or more DAS nodes is connected to the central communications hub site over a fiber optic cable.

22. The system of claim 21, wherein the one or more DAS nodes are connected to the central communications hub site with fiber optic cables in a hub and spoke configuration.

23. The system of claim 21, wherein the one or more DAS nodes are connected to the central communications hub site with fiber optic cables in a daisy chain configuration, wherein one of the one or more DAS nodes connects to the central communications hub site through another of the one or more DAS nodes.

* * * * *